(No Model.)
C. HAMMILL.
ICE CREAM DASHER.
No. 474,989. Patented May 17, 1892.
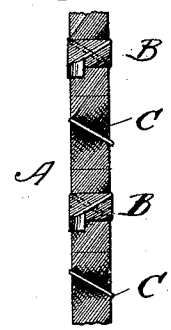
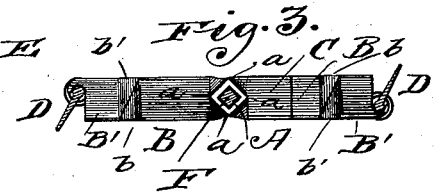
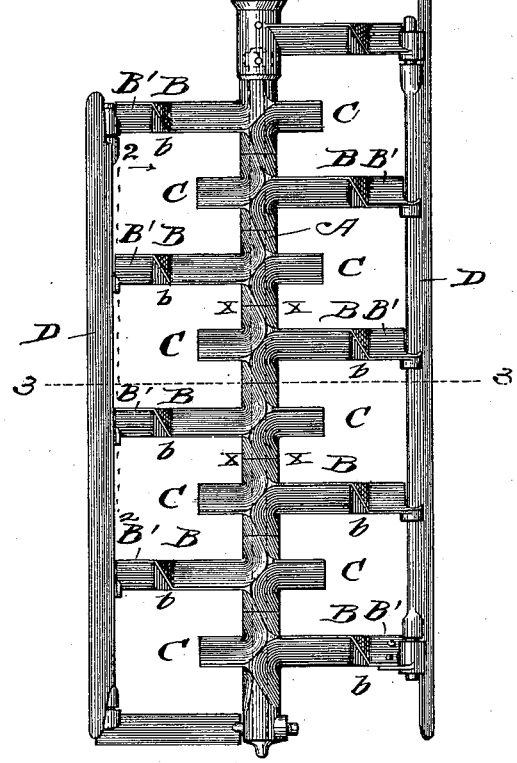
Witnesses,
S. T. Mann,
Richard Jacker,
Inventor,
Charles Hammill
By Offield, Towle & Linthicum
Attys.

UNITED STATES PATENT OFFICE.

CHARLES HAMMILL, OF CHICAGO, ILLINOIS, ASSIGNOR TO THE M. E. PAGE CONFECTIONERY COMPANY, OF SAME PLACE.

ICE-CREAM DASHER.

SPECIFICATION forming part of Letters Patent No. 474,989, dated May 17, 1892.

Application filed July 30, 1891. Serial No. 401,137. (No model.)

*To all whom it may concern:*

Be it known that I, CHARLES HAMMILL, a citizen of the United States, residing at Chicago, Illinois, have invented certain new and useful Improvements in Ice-Cream Dashers, of which the following is a specification.

The object of my invention is to provide an ice-cream dasher that will when in operation cause movement of the cream between the side and center of the freezer in opposite directions, thereby securing a thorough and constant circulation of the cream both up and down between the center and side wall.

My invention consists, essentially, in an ice-cream dasher having a central spindle provided with arms twisted between their ends so that two or more portions of the said arms are angularly disposed with reference to each other.

My invention consists, further, in an ice-cream dasher having arms constructed with the two ends thereof angularly disposed with reference to each other and a central spindle whose sides are flattened so as to form inclined or beveled surfaces, which assist in moving the cream at the center or warmer part of the freezer.

My invention consists, also, in details of construction hereinafter described, and particularly pointed out in the claims.

In the drawings, Figure 1 is a side elevation of the dasher, showing the central spindle and radial arms formed integrally. Fig. 2 is a broken sectional elevation on the line 2 2 of Fig. 1, and Fig. 3 is a sectional plan view below the line 3 3 of Fig. 1.

In the drawings, A represents the central spindle, the sides of which are flattened, the flattened portions being substantially triangular in form, as indicated at $a$, and beveled or inclined. These triangular portions assist to give direction and movement to the cream surrounding the spindle. Springing from the bases of these triangular portions are the long arms B and the short arms C, alternating with each other on the same side of the spindle. The arms B are twisted or offset between their ends, as shown at $b$, the outer portion B′ being thus disposed at substantially a right angle to the base portion of the arm. When the arms are cast, the metal will be thicker in the angles of the bend, as at $b'$; but if the arms are made from a metal which is readily wrought they may be of uniform thickness from end to end and simply twisted to provide the base portions and the outer portions angularly disposed with reference to the base.

D represents the usual side scrapers, and E the operating-shaft, which is secured in a socket formed in the upper end of the spindle.

I have contemplated constructing this dasher in sections, as indicated by the lines $x$ $x$, and in such case the spindle would be composed of a number of hollow hub-sections with the arms integrally formed thereon, and these hub-sections would be secured together by a tie-rod F, as shown in Fig. 3. Obviously the short arm C might be omitted, or, if desired, the number of arms B increased. The long arms might be bent at more than one point, so as to provide a number of portions angularly disposed with reference to each other.

In operation the cream surrounding the spindle is moved in an upward direction on one side of the spindle and in a downward direction on the opposite side of the spindle by the oppositely-inclined base-sections of the arms B and the correspondingly-inclined short arms C, these movements being facilitated by the flattened inclined portions of the spindle. A constant movement of the cream at the middle of the freezer and on all sides of the spindle is thus maintained, while the cream at the sides of the freezer is moved in opposite directions by the reversely-inclined ends B′ of the arms B. There is thus maintained between the spindle and the sides of the freezer two oppositely-moving streams of the material, which results in its thorough commingling while being frozen, thus preventing unequal congealing and producing a uniformly-smooth cream.

I claim—

1. An ice-cream dasher comprising a spindle having its exterior flattened and beveled and radial arms springing from the bases of said flattened portions, said arms having portions angularly disposed with reference to each other, substantially as described.

2. An ice-cream dasher comprising a central vertical spindle whose sides have triangularly-shaped flattened and beveled or inclined portions and radial arms projecting from the bases of said triangular portions of the spindle, said arms having their bases and outer ends angularly disposed with reference to each other, substantially as described.

3. An ice-cream dasher comprising a central spindle having projected from opposite sides thereof arms of unequal lengths alternately arranged, substantially as described.

CHARLES HAMMILL.

Witnesses:
C. C. LINTHICUM,
FREDERICK C. GOODWIN.